US012676414B2

(12) United States Patent
Lee et al.

(10) Patent No.: US 12,676,414 B2
(45) Date of Patent: Jul. 7, 2026

(54) ANTENNA STRUCTURE AND ELECTRONIC DEVICE INCLUDING SAME

(71) Applicant: SAMSUNG ELECTRONICS CO., LTD., Suwon-si (KR)

(72) Inventors: Woosup Lee, Suwon-si (KR); Taejun Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 110 days.

(21) Appl. No.: 18/608,333

(22) Filed: Mar. 18, 2024

(65) Prior Publication Data

US 2024/0332797 A1 Oct. 3, 2024

Related U.S. Application Data

(63) Continuation of application No. PCT/KR2024/002056, filed on Feb. 14, 2024.

(30) Foreign Application Priority Data

Mar. 28, 2023 (KR) ........................ 10-2023-0040774
Apr. 14, 2023 (KR) ........................ 10-2023-0049191

(51) Int. Cl.
*H01Q 1/02* (2006.01)
*H01Q 7/00* (2006.01)
*H04B 5/26* (2024.01)

(52) U.S. Cl.
CPC ................. *H01Q 7/00* (2013.01); *H01Q 1/02* (2013.01); *H04B 5/263* (2024.01)

(58) Field of Classification Search
CPC .. H01Q 7/00; H01Q 1/02; H01Q 1/24; H01Q 1/243; H01Q 1/38; H01Q 7/06;
(Continued)

(56) References Cited

U.S. PATENT DOCUMENTS 10,256,540 B2 4/2019 An et al.
10,673,131 B2 6/2020 Ahn et al.
(Continued)

FOREIGN PATENT DOCUMENTS

CN 103915681 A 7/2014
CN 107771368 A 3/2018
(Continued)

OTHER PUBLICATIONS

International Search Report (PCT/ISA/210) issued by the International Searching Authority on May 13, 2024 in corresponding International Application No. PCT/KR2024/002056.
(Continued)

*Primary Examiner* — Dimary S Lopez Cruz
*Assistant Examiner* — Michael M Bouizza
(74) *Attorney, Agent, or Firm* — Sughrue Mion, PLLC

(57) ABSTRACT

An electronic device includes: a battery; a main circuit board operatively connected to the battery; and an antenna structure operatively connected to the main circuit board, the antenna structure including: a base board; a first flexible printed circuit board (FPCB) electrically connected to the main circuit board; a first coil including a first end portion and a second end portion, wherein the first end portion is electrically connected to the first FPCB; a second coil including a third end portion and a fourth end portion, wherein the third end portion is electrically connected to the first FPCB and at least a part of the second coil is disposed inside the first coil; and a conductive member electrically connected to the second end portion of the first coil and the fourth end portion of the second coil.

16 Claims, 13 Drawing Sheets

(58) Field of Classification Search
CPC ......... H04B 5/263; H01R 12/79; H04M 1/02;
H05K 7/20; H02J 50/005; H02J 50/10;
H02J 50/402
See application file for complete search history.

(56) References Cited

U.S. PATENT DOCUMENTS

| | | | | |
|---|---|---|---|---|
| 11,463,131 | B2 | 10/2022 | Lee et al. | |
| 11,848,500 | B2 * | 12/2023 | Yeom | H01Q 21/0025 |
| 2013/0229064 | A1 | 9/2013 | Moon et al. | |
| 2016/0210615 | A1 | 7/2016 | Lee et al. | |
| 2017/0047636 | A1 * | 2/2017 | Lee | H01Q 7/00 |
| 2017/0228721 | A1 * | 8/2017 | Lee | H04B 5/26 |
| 2018/0138746 | A1 | 5/2018 | Jang | |
| 2018/0287243 | A1 | 10/2018 | Ko et al. | |
| 2018/0301786 | A1 | 10/2018 | Leem | |
| 2018/0301790 | A1 | 10/2018 | Kim et al. | |
| 2019/0156997 | A1 * | 5/2019 | Chien | H04B 5/79 |
| 2020/0090858 | A1 | 3/2020 | Hong et al. | |
| 2021/0066807 | A1 * | 3/2021 | Lee | H04B 5/26 |
| 2021/0185843 | A1 | 6/2021 | Lee et al. | |
| 2022/0174824 | A1 * | 6/2022 | Lee | H04M 1/0277 |
| 2022/0209581 | A1 * | 6/2022 | Kim | H02J 50/10 |
| 2023/0118173 | A1 | 4/2023 | Oh et al. | |
| 2023/0179020 | A1 | 6/2023 | Kim et al. | |

FOREIGN PATENT DOCUMENTS

| | | | |
|---|---|---|---|
| CN | 212849958 | U | 3/2021 |
| KR | 10-1814229 | B1 | 1/2018 |
| KR | 10-2019-0040642 | A | 4/2019 |
| KR | 10-2020-0033023 | A | 3/2020 |
| KR | 10-2020-0034546 | A | 3/2020 |
| KR | 10-2020-0085479 | A | 7/2020 |
| KR | 10-2021-0075550 | A | 6/2021 |
| KR | 10-2021-0119818 | A | 10/2021 |
| KR | 10-2022-0015708 | A | 2/2022 |
| KR | 10-2022-0034413 | A | 3/2022 |
| KR | 10-2022-0100527 | A | 7/2022 |
| KR | 10-2022-0106473 | A | 7/2022 |
| KR | 10-2022-0134312 | A | 10/2022 |

OTHER PUBLICATIONS

Written Opinion (PCT/ISA/237) issued by the International Searching Authority on May 13, 2024 in corresponding International Application No. PCT/KR2024/002056.
Communication dated Feb. 18, 2026 issued by the European Patent Office in European Patent Application No. 24781013.8.

* cited by examiner

ANTENNA STRUCTURE AND ELECTRONIC DEVICE INCLUDING SAME

CROSS-REFERENCE TO RELATED APPLICATIONS

This application is a by-pass continuation application of International Application No. PCT/KR2024/002056, filed on Feb. 14, 2024, which is based on and claims priority to Korean Patent Application Nos. 10-2023-0040774, filed on Mar. 28, 2023, and 10-2023-0049191, filed on Apr. 14, 2023, in the Korean Intellectual Property Office, the disclosures of which are incorporated by reference herein their entireties.

BACKGROUND

1. Field

The disclosure relates to an electronic device and, for example, to an antenna structure and an electronic device including the same antenna structure.

2. Description of Related Art

Remarkable development in information communication and semiconductor technologies allows rapid spread and use of various electronic devices. Recent electronic devices have been developed to perform mobile communication.

The electronic device may refer to a device performing a particular function according to its programs. Non-limiting examples of the electronic device are a home appliance, an electronic scheduler, a portable multimedia player, a mobile communication terminal, a tablet PC, a video/sound device, a desktop PC or laptop computer, a navigation for automobile, and the like. For example, electronic devices may output stored information in a form of a sound or an image. In line with the high degree of integration of electronic devices and widespread use of super-fast large-capacity wireless communication, it has recently become possible to equip a single electronic device, such as a mobile communication terminal, with various functions. For example, not only a communication function, but also an entertainment function such as gaming, a multimedia function such as music/video playback, a communication and security functions for mobile banking and the like, a scheduling function, and an electronic wallet function may be integrated into a single electronic device. Such electronic devices have become compact enough for users to carry in a convenient way.

Furthermore, a sensor embedded in an electronic device and power supply have been increased in importance in order for information and communication devices to be connected and operated with each other regardless of time or place in an information-based society. As the types of mobile devices (such as a mobile phone) have been rapidly increased in number, charging a battery of a mobile device has required time and effort of users. As a way to address this issue, wireless power transmission technology has recently drawn attention. For example, a wireless power reception device (such as a mobile device) for wirelessly receiving energy may be driven by the received wireless power or may charge a battery by using the received wireless power and be driven by the charged power.

A wireless power transmission (or wireless energy transfer) technology refers to a technology of wirelessly transferring electrical energy from a transmitter to a receiver by using the principle of magnetic induction. Wireless energy transfer schemes may be divided into a magnetic induction scheme, an electromagnetic resonance scheme, and a power transmission scheme using a short-wavelength radio frequency.

The above-described information may be provided as a related art to help understanding of the disclosure. No claim or determination is made as to the applicability of any of the foregoing as prior art to the disclosure.

SUMMARY

According to an aspect of the disclosure, an electronic device includes: a battery; a main circuit board operatively connected to the battery; and an antenna structure operatively connected to the main circuit board, the antenna structure including: a base board; a first flexible printed circuit board (FPCB) electrically connected to the main circuit board; a first coil including a first end portion and a second end portion, wherein the first end portion is electrically connected to the first FPCB; a second coil including a third end portion and a fourth end portion, wherein the third end portion is electrically connected to the first FPCB and at least a part of the second coil is disposed inside the first coil; and a conductive member electrically connected to the second end portion of the first coil and the fourth end portion of the second coil.

The first coil is extended in a first rotation direction from the first end portion toward the second end portion, and wherein the second coil is extended in a second rotation direction from the third end portion toward the fourth end portion, the second rotation direction being opposite to the first rotation direction.

The first coil extends in a first rotation direction from the first end portion toward the second end portion, wherein the second coil extends in the first rotation direction from the fourth end portion toward the third end portion, and wherein the second coil has a shape wound at least twice.

The electronic device further includes: a display; and a second FPCB electrically connected to the display and the main circuit board.

The conductive member is not overlapped with the second FPCB in a thickness direction of the electronic device.

The electronic device further includes a heat dissipation sheet between the battery and the base board.

At least a portion of the heat dissipation sheet is disposed between the battery and the conductive member in a thickness direction of the electronic device.

Each of the first coil and the second coil includes a conductive pattern on a surface of the base board.

The antenna structure further includes a third coil outside the first coil and the second coil.

The third coil includes a conductive pattern on a surface of the base board.

The electronic device further includes a shielding sheet between the battery and the base board.

The electronic device further includes: a sub-circuit board; and a third FPCB electrically connected to the main circuit board and the sub-circuit board.

The conductive member is not overlapped with the third FPCB in a thickness direction of the electronic device.

The conductive member is overlapped with at least a portion of the second coil in a thickness direction of the electronic device.

The conductive member is disposed to cross the at least the portion of the second coil.

According to an aspect of the disclosure, an electronic device includes: a battery; a main circuit board operatively connected to the battery; and an antenna structure operatively connected to the main circuit board, the antenna structure including: a base board; a first flexible printed circuit board (FPCB) electrically connected to the main circuit board; a first coil including a first end portion and a second end portion, wherein the first end portion is electrically connected to the first FPCB; a second coil including a third end portion and a fourth end portion, wherein the third end portion is electrically connected to the first FPCB; and a conductive member electrically connected to the second end portion of the first coil and the fourth end portion of the second coil, the conductive member being overlapped with at least a portion of the second coil.

The conductive member is configured to cross the at least the portion of the second coil.

The first coil is extended in a first rotation direction from the first end portion toward the second end portion, wherein the second coil is extended in the first rotation direction from the fourth end portion toward the third end portion, and wherein the second coil has a shape wound at least twice.

The first coil has a semi-circle shape, and wherein the second coil has a spiral shape.

The electronic device further includes a heat dissipation sheet between the battery and the base board.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

Figure 1:
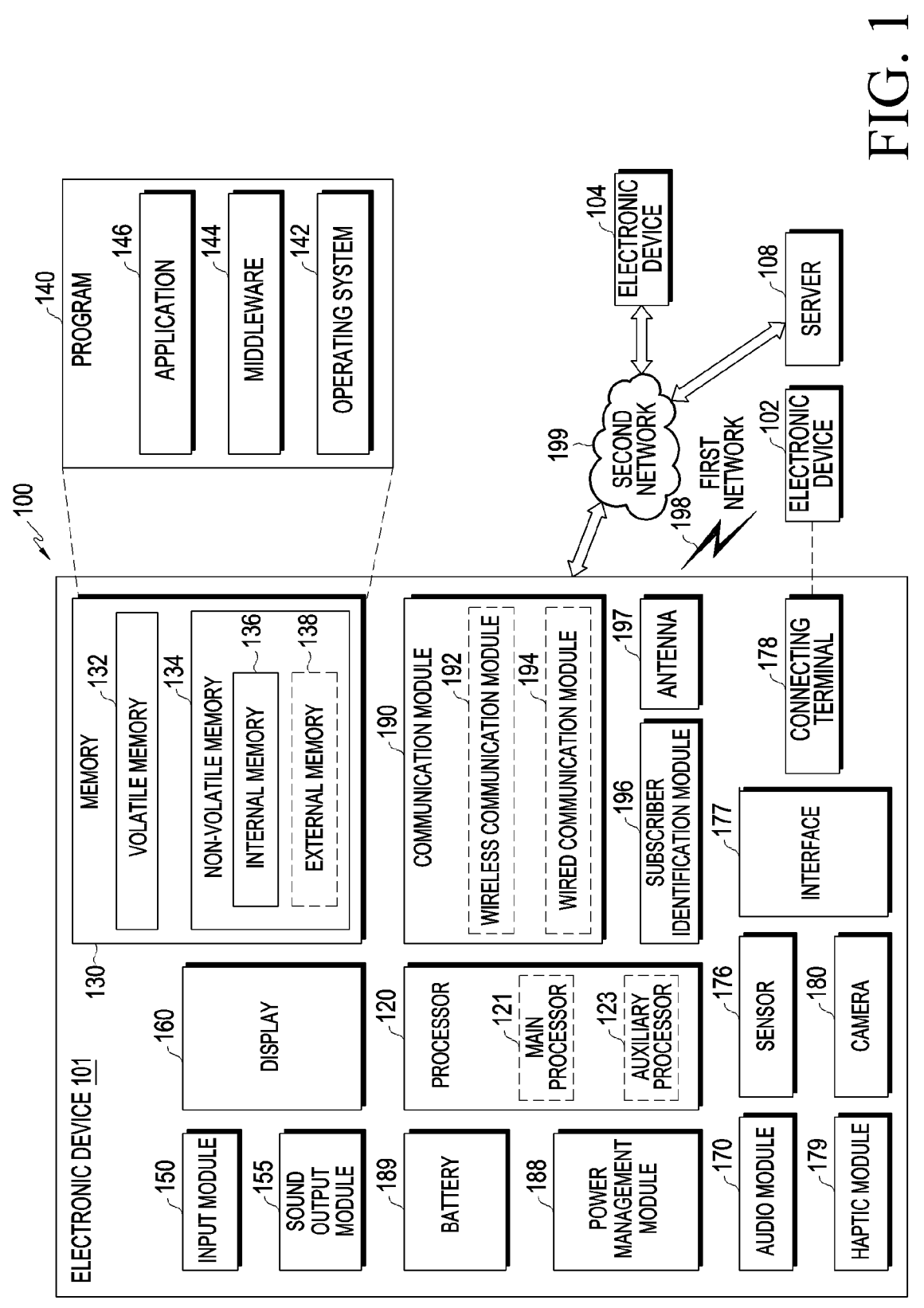
FIG. 1 illustrates an electronic device in a network environment according to one or more embodiments.

Hereinafter, an embodiment of the disclosure will be described with reference to accompanying drawings so as to be easily realized by a person having an ordinary knowledge in the art to which the disclosure pertains. However, the disclosure may be realized in many different forms and should not be construed as being limited to the embodiments disclosed herein. In connection with a description of the drawings, like or similar reference numerals may be used for like or similar elements. Furthermore, in the drawings and descriptions related thereto, descriptions of well-known functions and configurations may be omitted for clarity and brevity.

The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. Such a controller may be implemented in hardware or a combination of hardware and software and/or firmware. The functionality associated with any particular controller may be centralized or distributed, whether locally or remotely.

FIG. 1 is a block diagram illustrating an electronic device 101 in a network environment 100 according to embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display 160, an audio module 170, a sensor 176, an interface 177, a connecting terminal 178, a haptic module 179, a camera 180, a power management module 188, a battery 189, a communication module 190, a subscriber identification module (SIM) 196, or an antenna 197. In some embodiments, at least one of the components (e.g., the connecting terminal 178) may be omitted from the electronic device 101, or one or more other components may be added in the electronic device 101. In some embodiments, some of the components (e.g., the sensor 176, the camera 180, or the antenna 197) may be implemented as a single component (e.g., the display 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display 160, the sensor 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera 180 may capture a still image or moving images. According to an embodiment, the camera 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna 197 may transmit or receive a signal or power to or from the outside (e.g., the external electronic device) of the electronic device 101. According to an embodiment, the antenna 197 may include an antenna including a radiating element composed of a conductive material or a conductive pattern formed in or on a substrate (e.g., a printed circuit board (PCB)). According to an embodiment, the antenna 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna 197.

According to one or more embodiments, the antenna 197 may form a mmWave antenna. According to an embodiment, the mmWave antenna may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

In this disclosure, an electronic device or components thereof will be described with reference to the orthogonal coordinate system shown in FIGS. 2 to 13. The X-axis direction in FIGS. 2 to 13 may be defined or explained as a width direction of the electronic device or the components. The Y-axis direction in FIGS. 2 to 13 may be defined or explained as a lengthwise direction of the electronic device or the components. The Z-axis direction in FIGS. 2 to 13 may be defined or explained as a thickness direction or a height direction of the electronic device or the components. However, the directions are merely examples, and the electronic device or components of the electronic device of the disclosure are not limited thereto.

Figure 2:
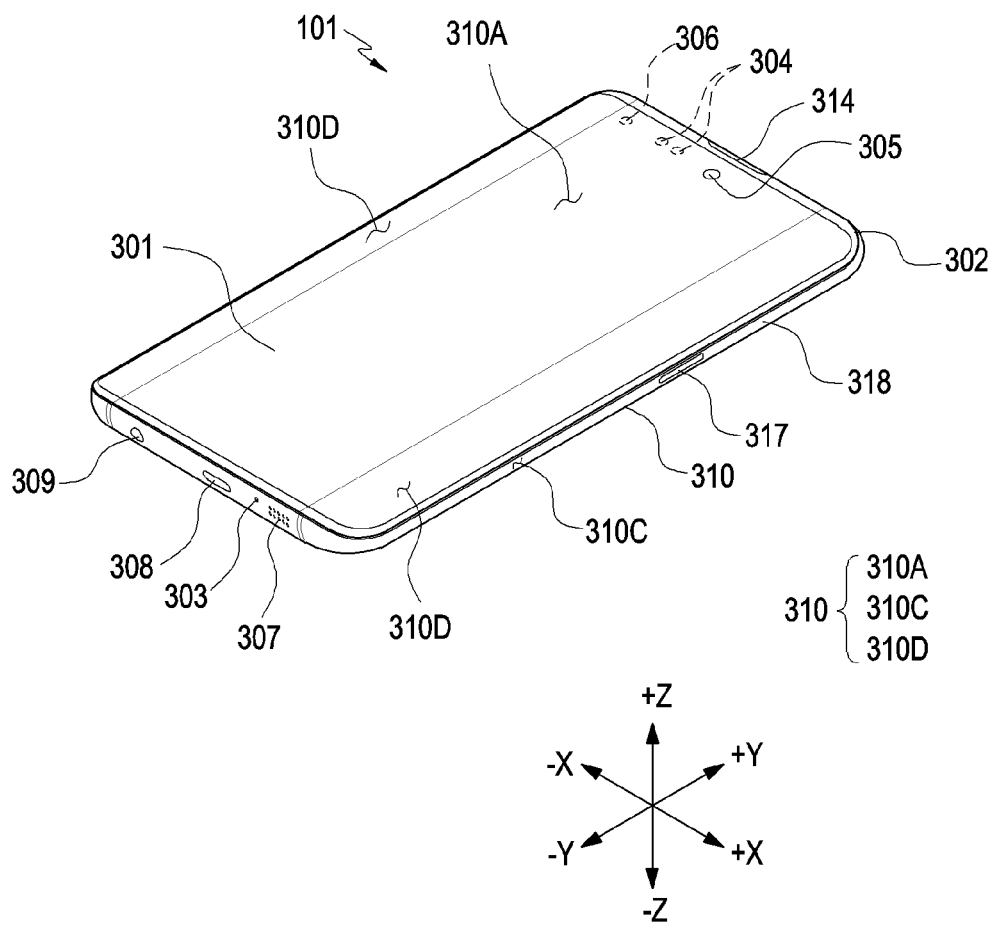
FIG. 2 is a front perspective view of an electronic device according to one or more embodiments of the disclosure.
Figure 3:
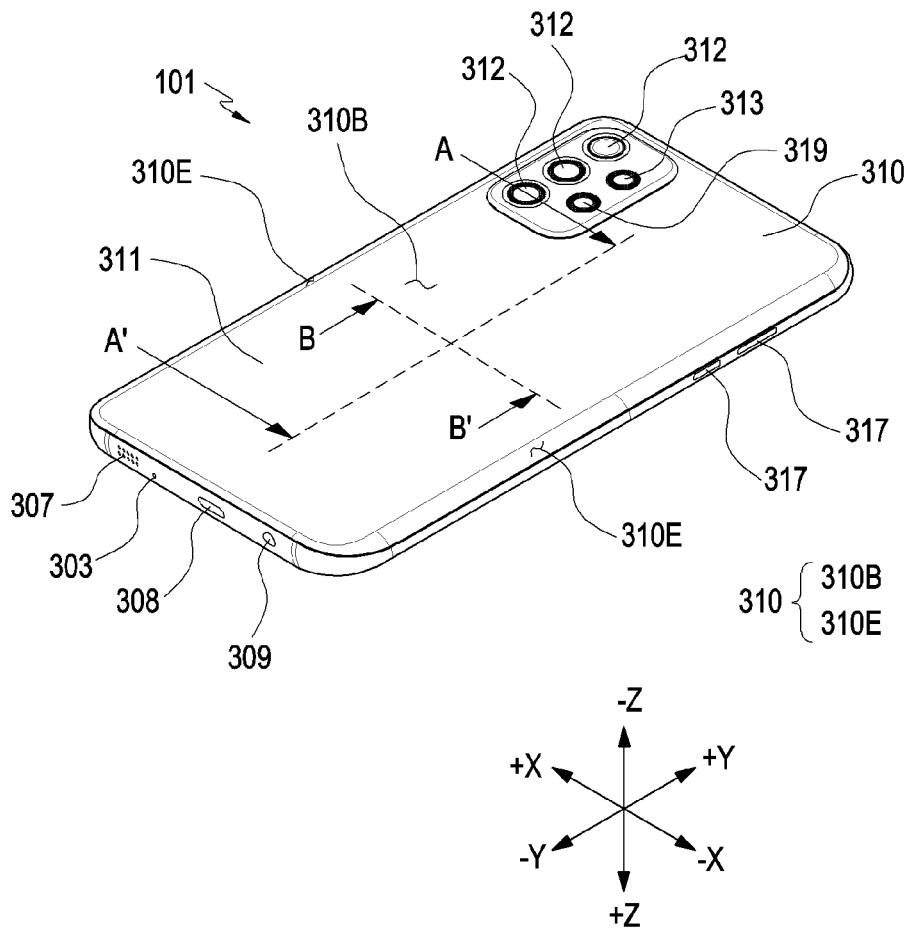
FIG. 3 is a rear perspective view of an electronic device according to one or more embodiments of the disclosure.

FIG. 2 is a front perspective view of an electronic device according to one or more embodiments of the disclosure. FIG. 3 is a rear perspective view of an electronic device according to one or more embodiments of the disclosure.

The embodiments in FIGS. 2 to 3 may be coupleable to the embodiment in FIG. 1 or the embodiments in FIGS. 4 to 13.

Referring to FIG. 2 and FIG. 3, the electronic device 101 according to an embodiment may include a housing 310 including a front surface 310A, a rear surface 310B, and a lateral surface 310C surrounding a space between the front surface 310A and the rear surface 310B. In an embodiment, the housing 310 may refer to a structure for configuring a portion of the front surface 310A in FIG. 2, the rear surface 310B in FIG. 3, and the lateral surface 310C in FIG. 2. According to an embodiment, at least a portion of the front surface 310A may be formed by a (substantially transparent) front plate 302 (e.g., a glass plate including various coating layers, or polymer plate). The rear surface 310B may be formed by a rear plate 311 that includes, for example, glass, ceramic, polymers, metals (e.g., aluminum, stainless steel (STS), or magnesium), or a combination of at least two thereof. The lateral surface 310C may be coupled to the front plate 302 and the rear plate 311 and formed by a lateral bezel structure (or a "lateral member") 318 including a metal and/or polymer. In an embodiment, the rear plate 311 and the lateral bezel structure 318 may be integrally formed and include the same material (e.g., glass, a metal material such as aluminum, or ceramic).

In one embodiment, the front plate 302 may include two first edge areas 310D bent toward the rear plate 311 from the front surface 310A to seamlessly extend and disposed at the opposite ends of a long edge of the front plate 302. In one embodiment (e.g., see FIG. 3), the rear plate 311 may include two second edge areas 310E bent and seamlessly extending toward the front plate 302 from the rear surface 310B and disposed at the opposite ends of a long edge. In an embodiment, the front plate 302 (or the rear plate 311) may include only one of the first edge areas 310D (or the second edge areas 310E). In an embodiment, a portion of the first edge areas 310D or the second edge areas 310E is not included. In the embodiments, when viewed from a lateral side of the electronic device 101, the lateral bezel structure 318 may have a first thickness (or width) at a lateral surface in which the first edge areas 310D or the second edge areas 310E is not included, and may have a second thickness thinner than the first thickness at a lateral surface in which the first edge areas 310D and the second edge areas 310E are included.

According to an embodiment, the electronic device 101 may include at least one of a display 301, an audio module (a microphone hole 303, a speaker hole 307, or another speaker hole 314) (e.g., audio module 170 of FIG. 1), a sensor (e.g., sensor 176 of FIG. 1), a camera 305, 312, or 313

(e.g., camera 180 of FIG. 1), a key input device 317 (e.g., input module 150 of FIG. 1), and a connector hole 308 or 309 (e.g., connecting terminal 178 of FIG. 1). In an embodiment, the electronic device 101 may omit at least one of the components (e.g., connector hole 309) or additionally include another component.

According to an embodiment, the display 301 (e.g., the display 160 of FIG. 1) may be visually exposed to outside through, for example, a substantial portion of the front plate 302. In an embodiment, at least a part of the display 301 may be exposed through the front plate 302 configuring the front surface 310A and the first edge areas 310D. In an embodiment, an edge of the display 301 may be configured to be substantially identical to a shape of an outer periphery adjacent to the front plate 302. In an embodiment, in order to expand an area through which the display 301 is exposed, a gap between an outer periphery of the display 301 and an outer periphery of the front plate 302 may be configured to be substantially identical.

According to an embodiment, the surface (e.g., the front plate 302) of the housing 310 may include a screen display area formed by visually exposing the display 301. In an embodiment, the screen display area may include the front surface 310A and the first edge areas 310D.

In an embodiment, the display 301 may include a recess or an opening configured on a portion of a screen display area (e.g., the front surface 310A or the first edge area 310D) thereof, and may include at least one of an audio module 314, a sensor, a light-emitting element, and a camera 305 which are aligned with the recess or the opening. In an embodiment, the display 301 may include at least one of an audio module 314, a sensor, a camera, a fingerprint sensor, and an light-emitting element on the rear surface of the screen display area. In an embodiment, the display 301 may be combined to or disposed adjacent to a touch sensing circuit, a pressure sensor for measuring a strength (pressure) of a touch, and/or a digitizer for detecting a magnetic field-type stylus pen. In an embodiment, at least a portion of the key input device 317 may be disposed on the first edge areas 310D and/or the second edge area 310E.

According to an embodiment, the audio module may, for example, include the microphone hole 303, the speaker hole 307, or the speaker hole 314. A microphone for obtaining a sound from outside may be disposed in the microphone hole 303 and in an embodiment, multiple microphones may be arranged to detect a direction of a sound. The speaker hole 307 or 314 may include an outer speaker hole 307 and a receiver hole 314 used for calling. In an embodiment, the speaker hole 307, 314 and the microphone hole 303 may be implemented into one hole, or a speaker may be included without a speaker hole 307, 314 (e.g., a piezo speaker). The audio module (the microphone hole 303, the speaker hole 307, or the speaker hole 314) is not limited to the aforementioned structure and may be designed in various ways, such as installing only some audio modules or adding new audio modules depending on the structure of the electronic device 101.

According to an embodiment, a sensor may generate an electrical signal or a data value corresponding to, for example, an internal operation state or external environment state of the electronic device 101. The sensor may include, for example, a first sensor (e.g., a proximity sensor) and/or a second sensor (e.g., a fingerprint sensor) disposed at the front surface 310A of the housing 310, and/or a third sensor (e.g., an heart rate monitoring (HRM) sensor) and/or a fourth sensor (e.g., a fingerprint sensor) disposed at the rear surface 310B of the housing 310. In an embodiment, the fingerprint sensor may be disposed at the rear surface 310B as well as at the front surface 310A (e.g., the display 301) of the housing 310. The electronic device 101 may further include at least one sensor not described in the drawing, for example, a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor. The sensor is not limited to the aforementioned structure and may be designed in various ways, such as installing only some sensors or adding new sensors depending on the structure of the electronic device 101.

According to an embodiment, the camera may include front camera 305 disposed at the front surface 310A of the electronic device 101 and a rear camera 312 disposed on the rear surface 310B and/or a flash 313 disposed on the rear surface 310B. The camera 305, 312 may include one or more of lenses, an image sensor, and/or an image signal processor. The flash 313 may include, for example, a light-emitting diode or a xenon lamp. In an embodiment, two or more lenses (infrared camera, and wide-angle or telephoto lens) and image sensors may be arranged on one surface of the electronic device 101. In an embodiment, two or more lenses (infrared camera, and wide-angle or telephoto lens) and image sensors may be arranged on one surface of the electronic device 101. In an embodiment, the flash 313 may emit an infrared ray and the infrared ray emitted by the flash 313 and reflected by a subject may be received through a third sensor 319. The electronic device 101 or the processor of the electronic device 101 may detect depth information of the subject based on a time point at which the third sensor 319 receives the infrared ray. The camera 305, 312, or 313 is not limited to the aforementioned structure and may be designed in various ways, such as installing only some cameras or adding new cameras depending on the structure of the electronic device 101.

According to an embodiment, the electronic device 101 may include multiple cameras (e.g., dual camera, or triple camera) each having different attributes (e.g., angle of view) or functions. For example, multiple camera 305 and 312 including lenses having different angles of view may be configured and based on selection of a user, the electronic device 101 may control an angle of view of a camera 305 or 312 performing in the electronic device 101. For example, at least one of the multiple cameras 305 and 312 may be a wide angle camera and at least another one may be a telephoto camera. Similarly, at least one of the multiple cameras 305 and 312 may be a front camera and at least another one may be a rear camera. In addition, the multiple cameras 305 and 312 may include at least one of a wide-angle camera, a telephoto camera, or an infrared (IR) camera (e.g., a time of flight (TOF) camera, or a structured light camera). According to an embodiment, the IR camera may operate as at least a portion of the sensor. For example, the TOF camera may operate as at least a portion of a sensor for detecting a distance to a subject.

According to an embodiment, the key input device 317 may be disposed on the lateral surface 310C of the housing 310. In another embodiment, the electronic device 101 may not include a portion or the entirety of the key input device 317 described above, and the excluded key input device 317 may be implemented as various forms such as a soft key on the display 301.

According to an embodiment, the electronic device 101 may further include a sensor 304 or 319 (e.g., the sensor 176 in FIG. 1).

According to an embodiment, the sensor 304 or 319 may generate an electrical signal or a data value corresponding to an internal operation state or external environment state of the electronic device 101. The sensor 304 or 319 may include a first sensor 304 (e.g., a proximity sensor) and/or a second sensor (e.g., a fingerprint sensor) disposed on the front surface 310A of the housing 310, and/or a third sensor 319 (e.g., an infrared (IR) sensor) and/or a fourth sensor (e.g., a fingerprint sensor) disposed on the rear surface 310B of the housing 310. The fingerprint sensor may be disposed not only on the front surface 310A (e.g., the display 301) but also on the rear surface 310B or the lateral surface 310C of the housing 310. The electronic device 101 may further include at least one of, for example, a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

According to an embodiment, the light-emitting element 306 may be disposed on, for example, the front surface 310A of the housing 310. The light-emitting element 306 may provide state information of the electronic device 101 in a light form, for example. In another embodiment, the light-emitting element 306 may provide, for example, a light source interlocking with an operation of the camera 305. The light-emitting element 306 may include, for example, a light emitting diode (LED), an infrared LED (IR) LED, and/or a xenon lamp.

According to an embodiment, the connector hole 308, 309 may include, for example, a first connector hole 308 capable of receiving a connector (e.g., a USB connector) for transmitting/receiving power and/or data to/from an external electronic device, and/or a second connector hole 309 (e.g., an earphone jack) capable of receiving a connector for transmitting/receiving an audio signal to/from an external electronic device.

According to an embodiment, a camera 305 of the cameras 305 and 312 and/or a sensor of the sensors may be disposed to be exposed to the outside through at least a portion of the display 301. For example, the camera 305 may include a punch hole camera disposed inside a hole or recess configured on the rear surface of the display 301. According to an embodiment, the camera 312 may be disposed in the housing 310 so that a lens is exposed through the rear surface 310B of the electronic device 101. For example, the camera 312 may be disposed on a printed circuit board (e.g., the printed circuit board 340 in FIG. 4).

According to an embodiment, the camera 305 and/or the sensor 304 or 319 may be disposed in the inner space of the electronic device 101 to be in contact with the external environment through a transparent area from the front plate 302 to the display 301. In addition, a sensor 304 may be disposed in the inner space of the electronic device to perform functions thereof without being visually exposed through the front plate 302.

Figure 4:
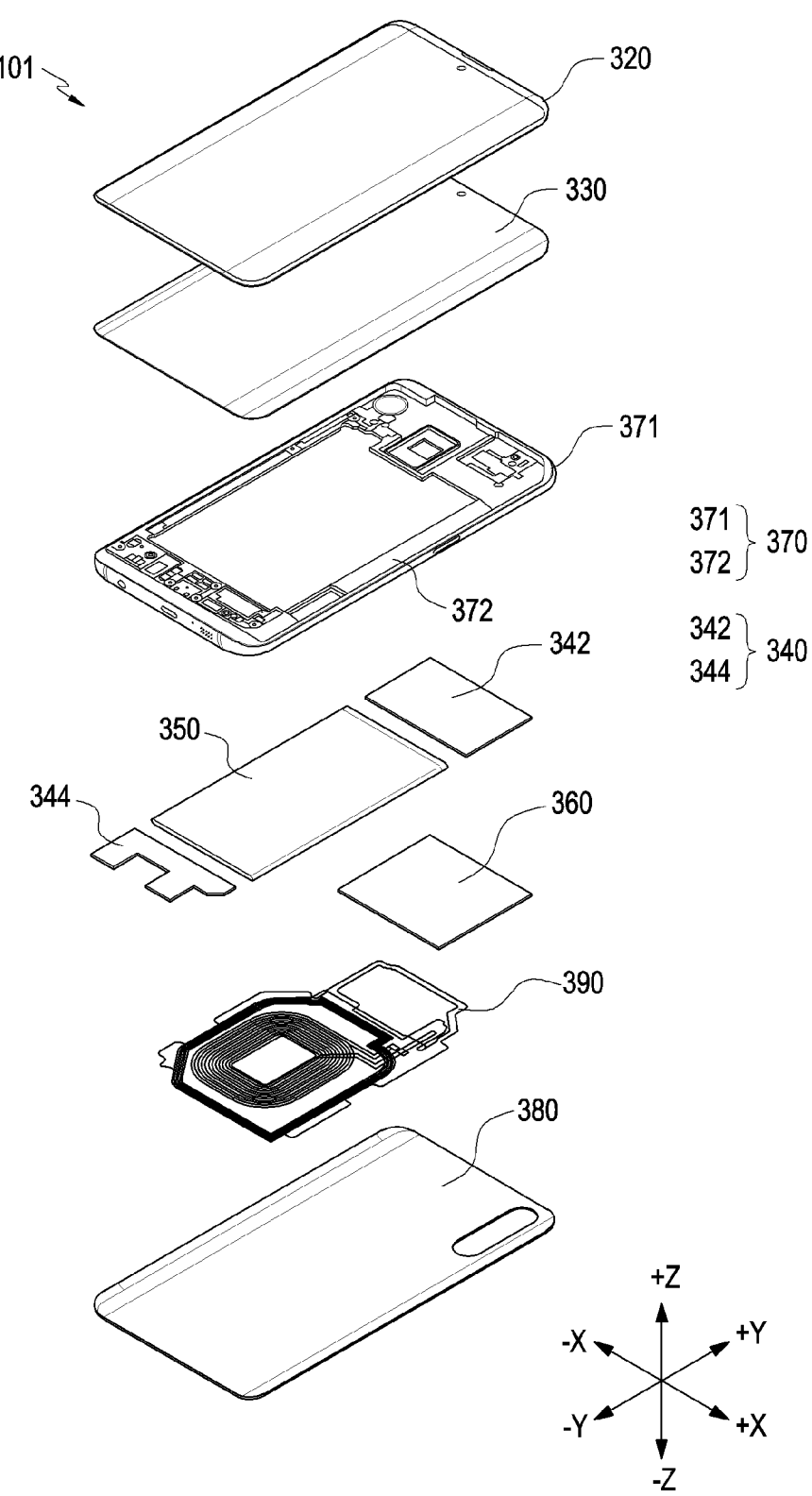
FIG. 4 is an exploded perspective view of an electronic device according to one or more embodiments of the disclosure.

FIG. 4 is an exploded perspective view of an electronic device according to one or more embodiments of the disclosure.

The embodiment in FIG. 4 may be coupleable to the embodiments in FIGS. 1 to 3 or the embodiments in FIGS. 5 to 13.

Referring to FIG. 4, an electronic device 101 (e.g., the electronic device 101 in FIGS. 1 to 3) according to an embodiment may include a housing 370 (e.g., the housing 310 in FIGS. 2 to 3), a front plate 320 (e.g., the front plate 302 in FIG. 2), a display 330 (e.g., the display 301 in FIG. 2), a circuit board 340 (e.g., the printed circuit board (PCB), a flexible PCB (FPCB), or a rigid flexible PCB (RFPCB)), a battery 350 (e.g., the battery 189 in FIG. 1), a second support member 360 (e.g., a rear structure), a rear plate 380 (e.g., the rear plate 311 in FIG. 2), or an antenna (or antenna structure) 390 (e.g., the antenna 197 in FIG. 1). In an embodiment, the housing 370 may be a structure further including the front plate 320 and/or the rear plate 380. The housing 370 of the electronic device 101 according to an embodiment may include a lateral bezel structure 371 (e.g., the lateral bezel structure 318 in FIG. 2) and a first support member 372.

In an embodiment, the electronic device 101 may omit at least one component (e.g., the first support member 372 or the second support member 360) or may additionally include another component. At least one component of the electronic device 101 may be the same as or similar to at least one component of the electronic device 101 of FIG. 2 or FIG. 3 and an overlapping description thereof will be omitted.

According to an embodiment, the first support member 372 may be disposed in the electronic device 101 to be connected to the lateral bezel structure 371 or integrally formed with the lateral bezel structure 371. The first support member 372 may be formed of, for example, a metal material and/or a non-metal (e.g., a polymer) material. The first support member 372 may have one surface coupled to the display 330 and the other surface coupled to the circuit board 340.

According to one or more embodiments, at least one processor (e.g., the processor 120 in FIG. 1), memory (e.g., the memory 130 in FIG. 1), and/or an interface (e.g., the interface 177 in FIG. 1) may be mounted on the circuit board 340. The processor may include one or more of, for example, a central processing unit, an application processor, a graphic processing unit, an image signal processor, a sensor herb processor, or a communication processor. According to an embodiment, the circuit board 340 may include a flexible printed circuit board type radio frequency cable (FRC). For example, the circuit board 340 may be disposed on at least a portion of the first support member 372 and electrically connected to an antenna (e.g., the antenna 197 in FIG. 1) and a communication module (e.g., the communication module 190 in FIG. 1).

In some embodiments of the disclosure, the circuit board 340 may include a main circuit board 342 or a sub-circuit board 344. In some embodiments of the disclosure, the main circuit board 342 may be referred to as a first circuit board, and the sub-circuit board 344 may be referred to as a second circuit board.

According to an embodiment, the main circuit board 342 may include a printed circuit board (PCB), a flexible circuit board (flexible PCB), or a rigid flexible PCB (RF PCB).

According to an embodiment, a camera (e.g., the camera 312 in FIG. 3 or the camera 608 in FIG. 13) may be mounted on or electrically connected to the main circuit board 342.

According to an embodiment, one or more electrical elements may be disposed on or mounted on the main circuit board 342. The one or more electrical components may include at least one processor (e.g., the processor 120 in FIG. 1), memory (e.g., the memory 130 in FIG. 1), or a power management module (e.g., the power management module 188 in FIG. 1).

According to an embodiment, the main circuit board 342 may be electrically connected to the battery 350 through the power management module mounted on the main circuit board 342.

According to an embodiment, the main circuit board 342 may be operatively connected to the battery 350. The main circuit board 342 may be operatively connected to the antenna 390.

According to an embodiment, an interface (e.g., the interface 177 in FIG. 1) may be mounted on the sub-circuit board 344.

According to an embodiment, the sub-circuit board 344 may include a printed circuit board (PCB), a flexible circuit board (flexible PCB), or a rigid flexible PCB (RF PCB).

According to an embodiment, the memory may include, for example, volatile memory or nonvolatile memory.

According to an embodiment, the interface may include, for example, a high-definition multimedia interface (HDMI), a universal serial bus (USB) interface, an SD card interface, and/or an audio interface. The interface may electrically or physically connect, for example, the electronic device 101 and an external electronic device and may include a USB connector, an SD care/MMC connector, or an audio connector.

According to an embodiment, the electronic device 101 may further include a flexible printed circuit board (e.g., the second FPCB 605 in FIG. 13) configured to electrically connect the main circuit board 342 and the display 330. According to an embodiment, the electronic device 101 may further include a flexible printed circuit board (e.g., the third FPCB 606 in FIG. 13) configured to electrically connect the main circuit board 342 and the sub-circuit board 344.

According to one or more embodiments, the battery 350 is a device for supplying power to at least one component of the electronic device 101, and may include a non-rechargeable primary battery, a rechargeable secondary battery, or a fuel cell. At least a portion of the battery 350 may be disposed on a substantially identical plane to the printed circuit board 340. The battery 350 may be disposed in and integrated into the electronic device 101, and may be disposed in the electronic device 101 to be attachable and detachable.

According to one or more embodiments, the second support member 360 (e.g., a rear structure) may be disposed between the printed circuit board 340 and the antenna (or the antenna structure) 390. For example, the second support member 360 may include one surface to which at least one of the printed circuit board 340 or the battery 350 is coupled and the other surface to which the antenna 390 is coupled.

According to one or more embodiments, the antenna 390 may be disposed between the rear plate 380 and the battery 350. The antenna 390 may include, for example, a near field communication (NFC) antenna, a wireless charging antenna, and/or a magnetic secure transmission (MST) antenna. The antenna may, for example, perform near field communication with an external device or transmit and receive power required for charging. In another embodiment, an antenna structure may be formed by a part or a combination of the lateral bezel structure 371 and/or the first support member 372.

According to an embodiment, the antenna 390 may be operatively connected to the main circuit board 342.

According to one or more embodiments, the rear plate 380 may form at least a portion of a rear surface (e.g., the rear surface 310B of FIG. 3) of the electronic device 101.

Figure 5:
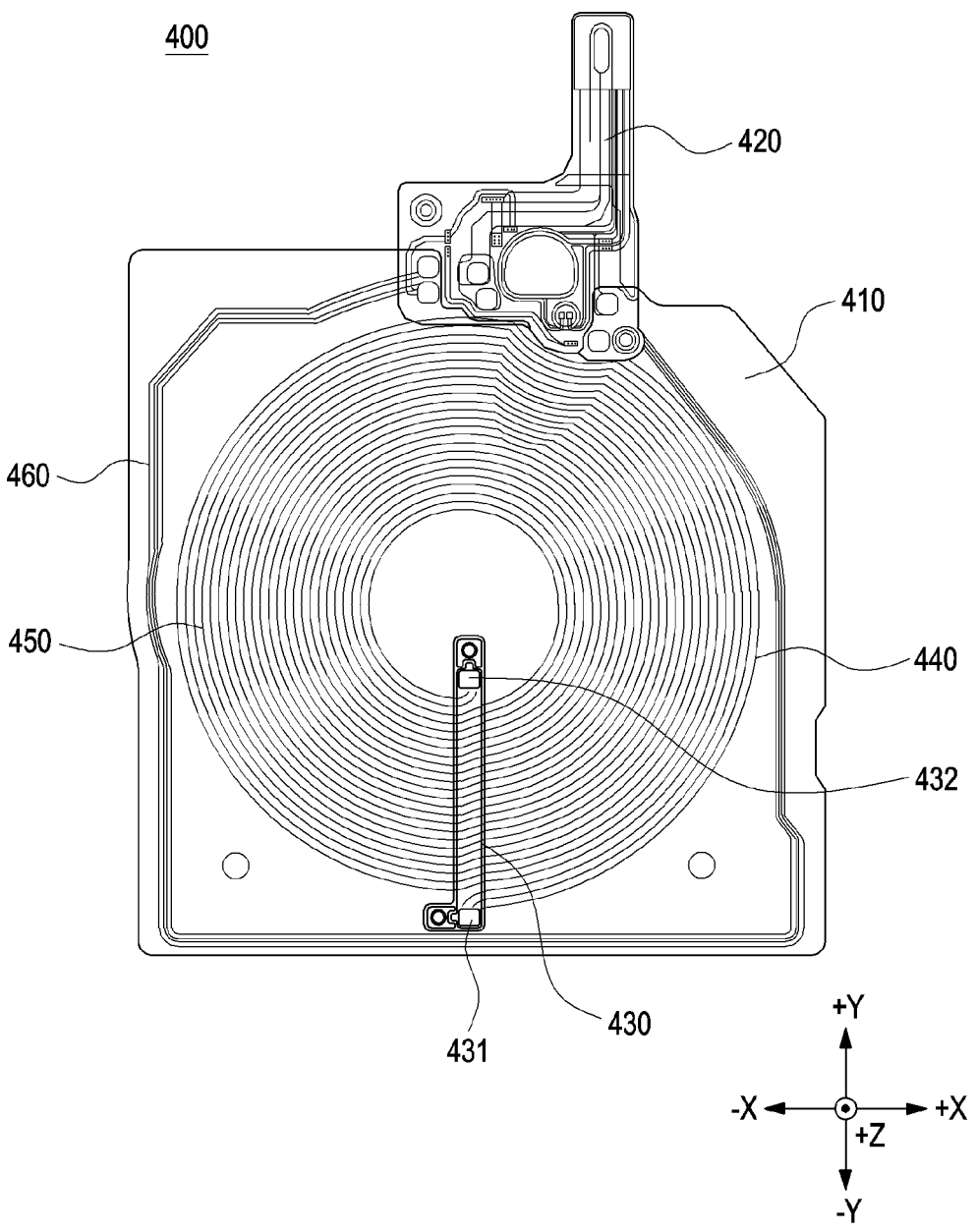
FIG. 5 is a planar view of a wireless charging structure according to an embodiment of the disclosure.

FIG. 5 is a planar view of a wireless charging structure according to an embodiment of the disclosure.

Figure 6:
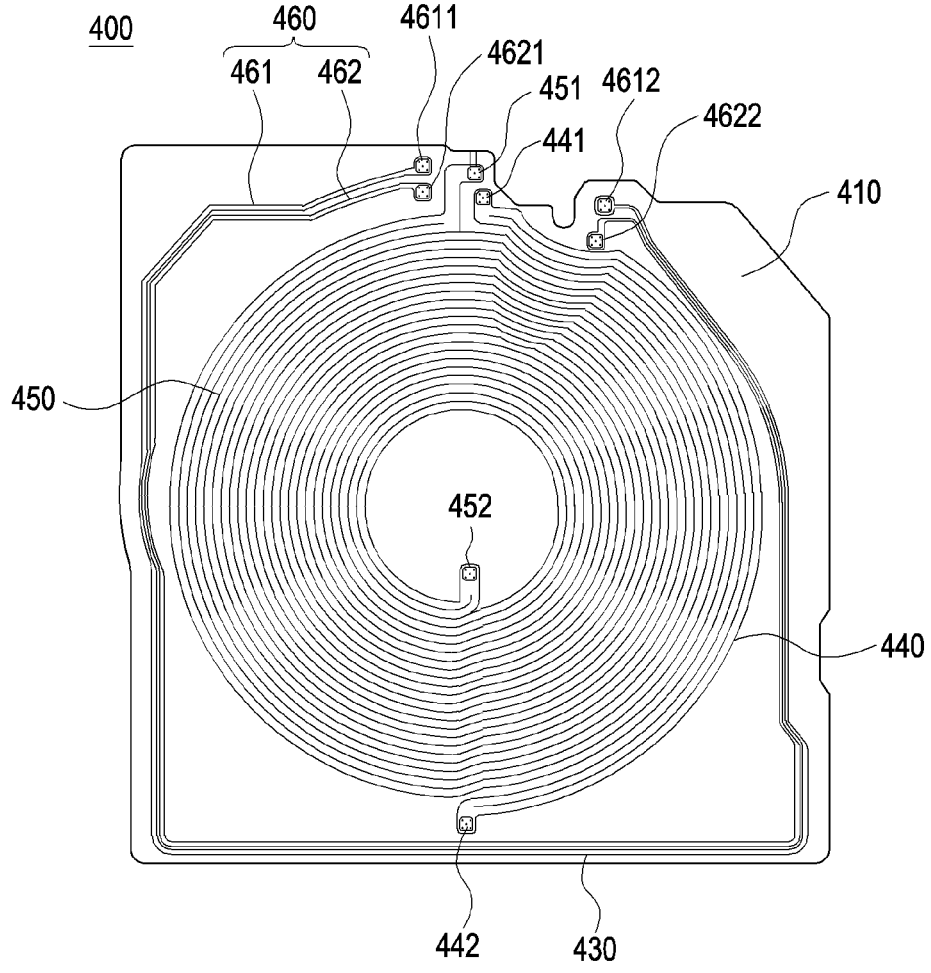
FIG. 6 is a planar view of a base board and at least one coil of a wireless charging structure according to an embodiment of the disclosure.

FIG. 6 is a planar view of a base board and at least one coil of a wireless charging structure according to an embodiment of the disclosure.

Figure 7:
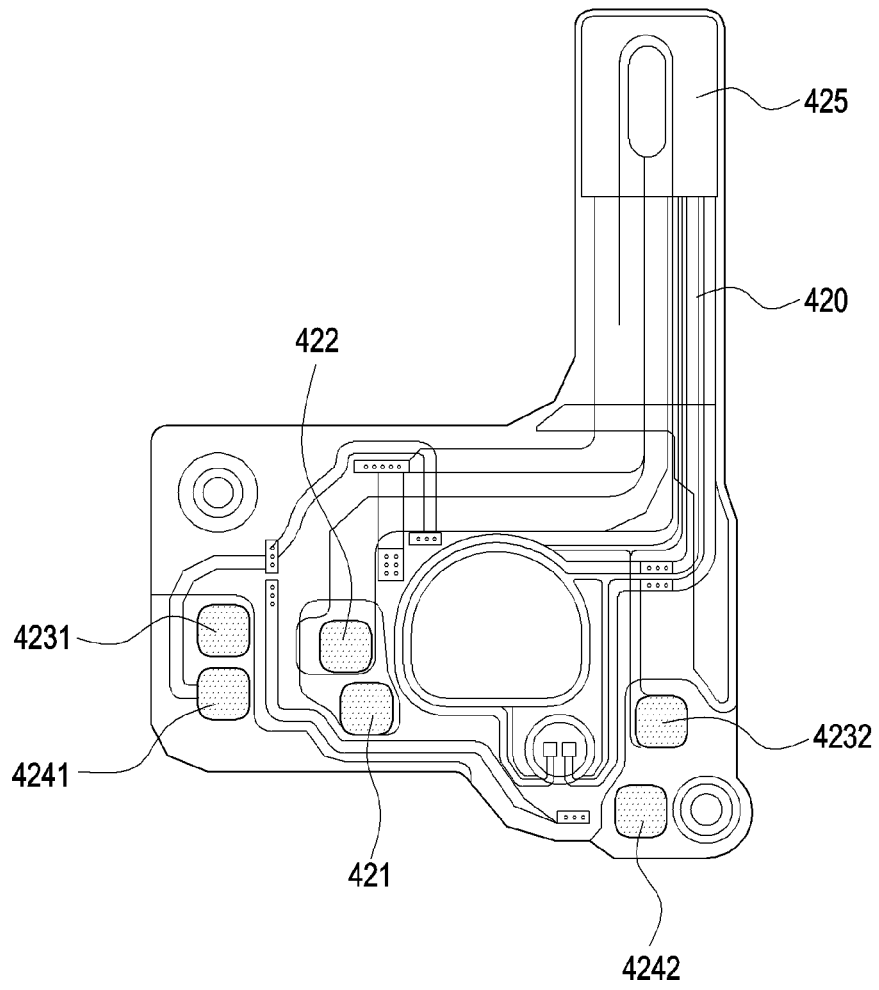
FIG. 7 is a planar view of a first FPCB of a wireless charging structure according to an embodiment of the disclosure.

FIG. 7 is a planar view of a first FPCB of a wireless charging structure according to an embodiment of the disclosure.

Figure 8:
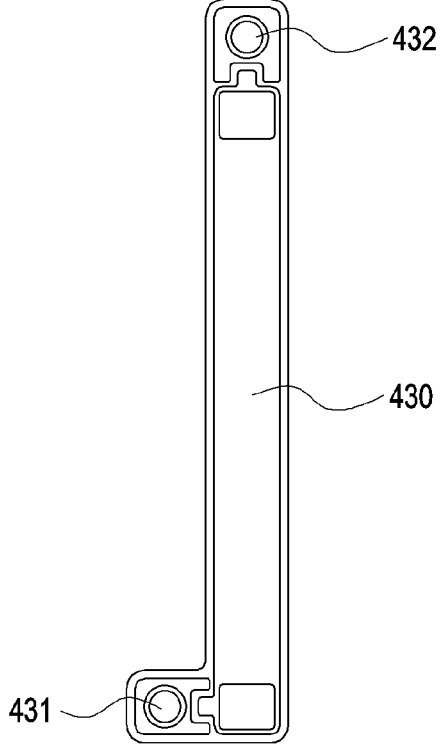
FIG. 8 is a planar view of a conductive structure of a wireless charging structure according to an embodiment of the disclosure.

FIG. 8 is a planar view of a conductive structure of a wireless charging structure according to an embodiment of the disclosure.

The embodiments in FIGS. 5 to 8 may be coupleable to the embodiments in FIGS. 1 to 4 or the embodiments in FIGS. 9 to 13.

Referring to FIGS. 5 to 8, an antenna structure 400 may include a base board 410, a first FPCB 420, a conductive member 430, or at least one coil 440, 450, or 460.

The configuration of the antenna structure 400 of FIG. 5 may be entirely or partially identical to that of the antenna 390 of FIG. 4.

According to an embodiment, the antenna structure 400 may be disposed (provided or placed) between a battery (e.g., the battery 350 in FIG. 4) and a rear plate (e.g., the rear plate 380 in FIG. 4) of an electronic device (e.g., the electronic device 101 in FIG. 4).

According to an embodiment, the antenna structure 400 may be operatively connected to the main circuit board (e.g., the main circuit board 342 of FIG. 1).

According to an embodiment, the base board 410 may provide an overall body of the antenna structure 400. The base board 410 may correspond to a copper coil in which at least one coil 440, 450, or 460 is configured on one surface (e.g., a surface facing a +Z direction in FIG. 4 or 5) of the base board 410. In the base board 410 formed of the copper foil, the copper foil may be provided as a single layer.

According to an embodiment, the base board 410 may provide an overall body of the antenna structure 400. The base board 410 may correspond to a flexible printed circuit board (flexible PCB, FPCB) in which at least one coil 440, 450, or 460 is configured on one surface (e.g., a surface facing the +Z direction in FIG. 4 or 5) of the base board 410. In the base board 410 formed of the FPCB, a board of the FPCB may be provided as a single layer.

According to an embodiment, in order to form or dispose the at least one coil 440, 450, or 460 on the base board 410, a laser direct structuring (LDS) method may be used. For example, the at least one coil 440, 450, or 460 may be formed on one surface of the base board 410 through the laser direct structuring method.

According to an embodiment, the at least one coil 440, 450, or 460 may include a first coil 440, a second coil 450, or a third coil 460.

According to an embodiment, the at least one coil 440, 450, or 460 may be referred to as at least one conductive pattern.

According to an embodiment, the base board 410 and the at least one coil 440, 450, or 460 may be defined or referred to as a coil pattern layer. For example, the coil pattern layer may include the base board 410 or the at least one coil 440, 450, or 460 disposed on a surface of base board 410.

According to an embodiment, the first coil 440 may include a first end portion 441 and a second end portion 442. The first end portion 441 may be electrically connected to the first FPCB 420, and the second end portion 442 may be electrically connected to the conductive member 430.

According to an embodiment, the first coil 440 may extend from the first end portion 441 toward the second end portion 442 in a substantially semicircle shape.

According to an embodiment, the second coil 450 may include a third end portion 451 and a fourth end portion 452. The third end portion 451 may be electrically connected to the first FPCB 420, and the fourth end portion 452 may be electrically connected to the conductive member 430.

According to an embodiment, at least a portion of the second coil 450 may be disposed inside the semicircle shape formed by the first coil 440.

According to an embodiment, the second coil 450 may extend from the third end portion 451 toward the fourth end portion 452 in a spiral shape wound at least twice. For example, the third end portion 451 of the second coil 450 may be an end portion of the second coil 450 disposed outside the spiral shape and the fourth end portion 452 of the second coil 450 may be an end portion of the second coil 450 disposed inside the spiral shape.

According to an embodiment, the second end portion 442 of the first coil 440 and the fourth end portion 452 of the second coil 450 may be electrically connected to each other through the conductive member 430.

According to an embodiment, the first coil 440 may be defined as a coil physically independent from the second coil 450 or defined as a coil physically separate from the second coil 450. In addition, the first coil 440 and the second coil 450 may be defined together as a coil that forms a path for a flow of a current.

According to an embodiment, the first coil 440 and the second coil 450 may function as a wireless charging antenna.

When an electronic device (e.g., the electronic device 101 in FIGS. 1 to 4) is mounted on a wireless charging pad (or wireless charging device), the first coil 440 and the second coil 450 of the antenna structure 400 of the electronic device may be aligned with a coil of the wireless charging pad. Here, in response to an electromagnetic field generated by the coil of the wireless charging pad, the first coil 440 and the second coil 450 of the electronic device may generate an induced current and the induced current generated by the first coil 440 and the second coil 450 may be used as charging power for charging a battery (e.g., the battery 350 in FIG. 4).

According to an embodiment, the first coil 440 and the second coil 450 may be electrically connected to a main circuit board (e.g., the main circuit board 342 in FIG. 4) through the first FPCB 420. For example, a connector 425 of the first FPCB 420 may be electrically connected to the main circuit board (e.g., the main circuit board 342 in FIG. 4).

According to an embodiment, a power management module (e.g., the power management module 188 in FIG. 1) mounted to the main circuit board (e.g., the main circuit board 342 in FIG. 4) may receive the induced current generated by the first coil 440 and the second coil 450 to charge the battery (e.g., the battery 350 in FIG. 4). A rectifier for rectifying the induced current may be mounted to the main circuit board (e.g., the main circuit board 342 in FIG. 4).

According to an embodiment, although the first coil 440 is provided as a coil separate or independent from the second coil 450, the first coil 440 may provide one electrical path for generating an induced current with the second coil 450 through the first FPCB 420 and the conductive member 430.

According to an embodiment, at least a portion of the third coil 460 may be disposed outside the first coil 440 and the second coil 450.

According to an embodiment, the third coil 460 may include an outer coil 461 and an inner coil 462 disposed relatively inside than the outer coil 461.

According to an embodiment, the outer coil 461 may include a fifth end portion 4611 and a sixth end portion 4612. The outer coil 461 may extend in a shape surrounding at least a portion of the inner coil 462 from the fifth end portion 4611 to the sixth end portion 4612.

According to an embodiment, the fifth end portion 4611 and the sixth end portion 4612 may be electrically connected to the first FPCB 420.

According to an embodiment, the inner coil 462 may include a seventh end portion 4621 and an eighth end portion 4622. The inner coil 462 may extend in a shape surrounding at least a portion of the first coil 440 and the second coil 450 from the seventh end portion 4621 to the eighth end portion 4622.

According to an embodiment, the seventh end portion 4621 and the eighth end portion 4622 may be electrically connected to the first FPCB 420.

According to an embodiment, the third coil 460 may be electrically connected to the main circuit board (e.g., the main circuit board 342 in FIG. 4) through the first FPCB 420.

According to an embodiment, the outer coil 461 and the inner coil 462 of the third coil 460 may function as a NFC antenna or MST antenna.

According to an embodiment, the outer coil 461 and the inner coil 462 of the third coil 460 may be controlled by a communication module (e.g., the communication module 190 in FIG. 1) mounted to the main circuit board (e.g., the main circuit board 342 in FIG. 4) to generate an RF signal for an NFC function (or MST function).

According to an embodiment, the first FPCB 420 may electrically connect the antenna structure 400 and the main circuit board (e.g., the main circuit board 342 in FIG. 4).

According to an embodiment, the first FPCB 420 may be a flexible printed circuit board. The first FPCB 420 may include the connector 425 configured to be connected to the main circuit board (e.g., the main circuit board 342 in FIG. 4).

According to an embodiment, the first FPCB 420 may include at least one connection pad (e.g., a third connection pad 421, a fourth connection pad 422, a fifth connection pad 4231, a sixth connection pad 4232, a seventh connection pad 4241, or an eighth connection pad 4242).

According to an embodiment, the third connection pad 421 of the first FPCB 420 may be electrically connected to the first end portion 441 of the first coil 440. For example, the third connection pad 421 of the first FPCB 420 may be connected to the first end portion 441 of the first coil 440.

According to an embodiment, the fourth connection pad 422 of the first FPCB 420 may be electrically connected to the third end portion 451 of the second coil 450. For example, the fourth connection pad 422 of the first FPCB 420 may be connected to the third end portion 451 of the second coil 440.

According to an embodiment, the fifth connection pad 4231 of the first FPCB 420 may be electrically connected to the fifth end portion 4611 of the outer coil 461. For example, the fifth connection pad 4231 of the first FPCB 420 may be connected to the fifth end portion 4611 of the outer coil 461.

According to an embodiment, the sixth connection pad 4232 of the first FPCB 420 may be electrically connected to the sixth end portion 4612 of the outer coil 461. For example, the sixth connection pad 4232 of the first FPCB 420 may be connected to the sixth end portion 4612 of the outer coil 461.

According to an embodiment, the seventh connection pad 4241 of the first FPCB 420 may be electrically connected to the seventh end portion 4621 of the inner coil 462. For example, the seventh connection pad 4241 of the first FPCB 420 may be connected to the seventh end portion 4621 of the inner coil 462.

According to an embodiment, the eighth connection pad 4242 of the first FPCB 420 may be electrically connected to the eighth end portion 4622 of the inner coil 462. For example, the eighth connection pad 4242 of the first FPCB 420 may be connected to the eighth end portion 4622 of the outer coil 461.

According to an embodiment, the conductive member 430 may electrically connect the first coil 440 and the second coil 450.

According to an embodiment, the conductive member 430 may correspond to a flexible printed circuit board (FPCB) or a conductive pattern for electrically connecting the second end portion 442 of the first coil 440 and the fourth end portion 452 of the second coil 450.

According to an embodiment, the conductive member 430 may overlap a portion of the second coil 450 based on the thickness direction (e.g., the Z-axis direction in FIGS. 4 to 5) of the electronic device (e.g., the electronic device 101 in FIG. 4). For example, the conductive member 430 may be disposed to cross a portion of the second coil 450.

According to an embodiment, the conductive member 430 may include at least one connection pad 431 or 432. The at least one connection pad 431 or 432 of the conductive member 430 may include a first connection pad 431 or a second connection pad 432.

According to an embodiment, the first connection pad 431 of the conductive member 430 may be electrically connected to the second end portion 442 of the first coil 440. For example, the first connection pad 431 of the conductive member 430 may be connected to the second end portion 442 of the first coil 440.

According to an embodiment, the second connection pad 432 of the conductive member 430 may be electrically connected to the fourth end portion 452 of the second coil 450. For example, the second connection pad 432 of the conductive member 430 may be connected to the fourth end portion 452 of the second coil 450.

Figure 9:
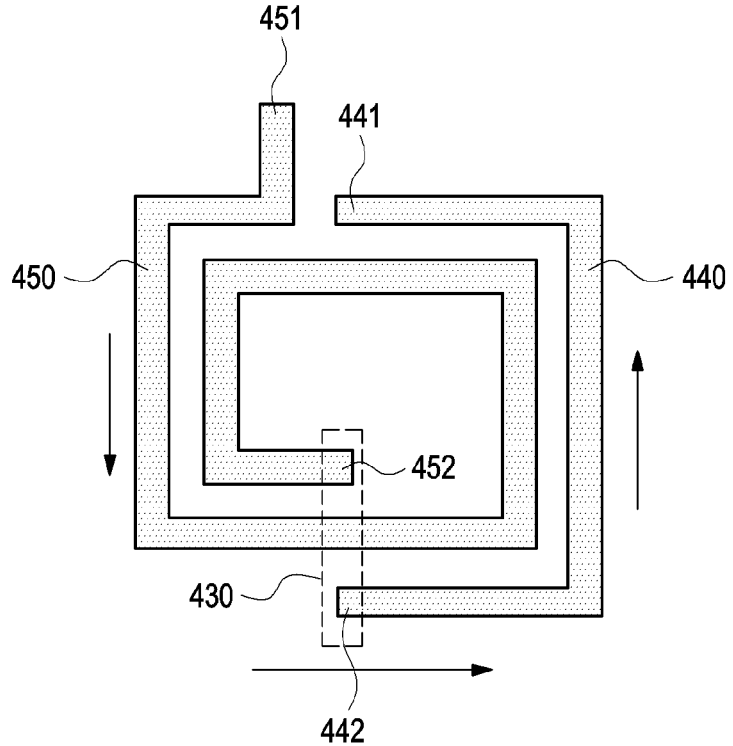
FIG. 9 is a schematic view of a shape of a first coil and a second coil according to an embodiment of the disclosure.

FIG. 9 is a schematic view of a shape of a first coil and a second coil according to an embodiment of the disclosure.

Figure 10A:
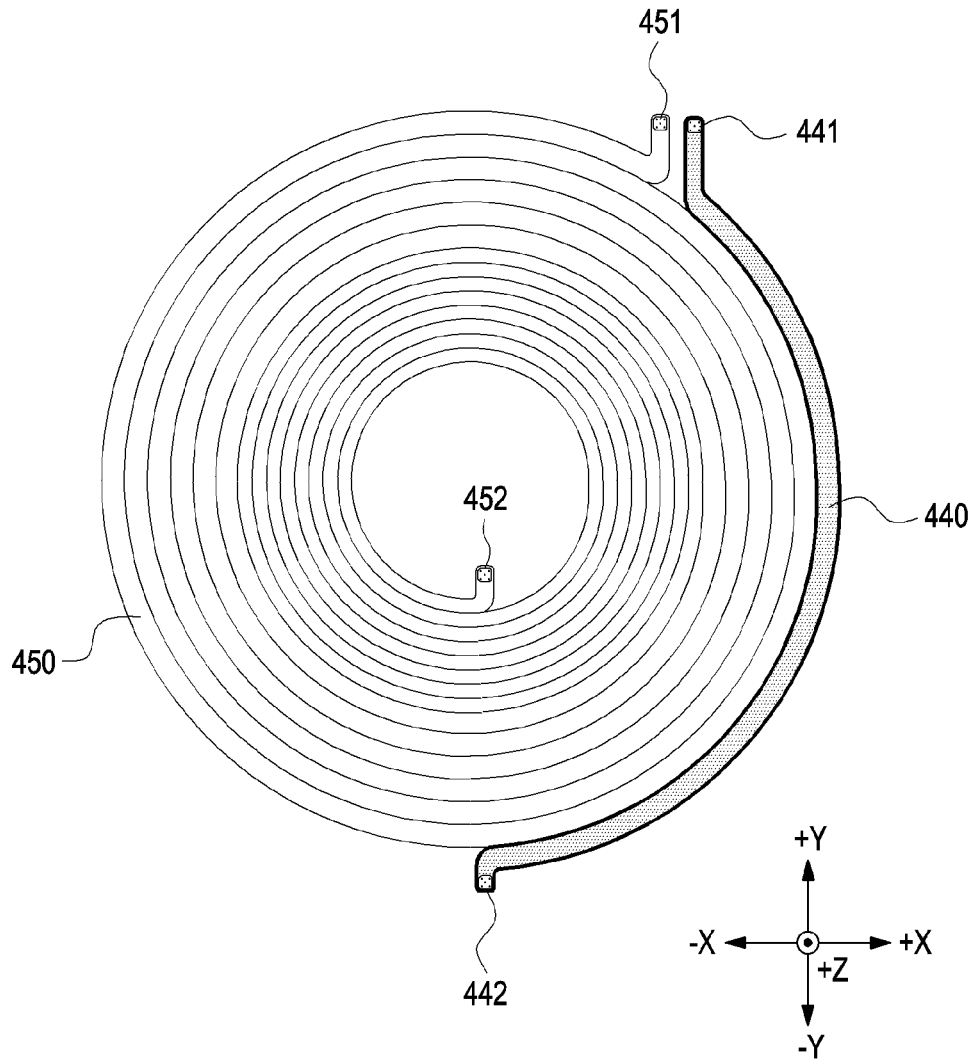
FIG. 10A is a planar view of a first coil and a second coil according to an embodiment of the disclosure.

FIG. 10A is a planar view of a first coil and a second coil according to an embodiment of the disclosure.

Figure 10B:
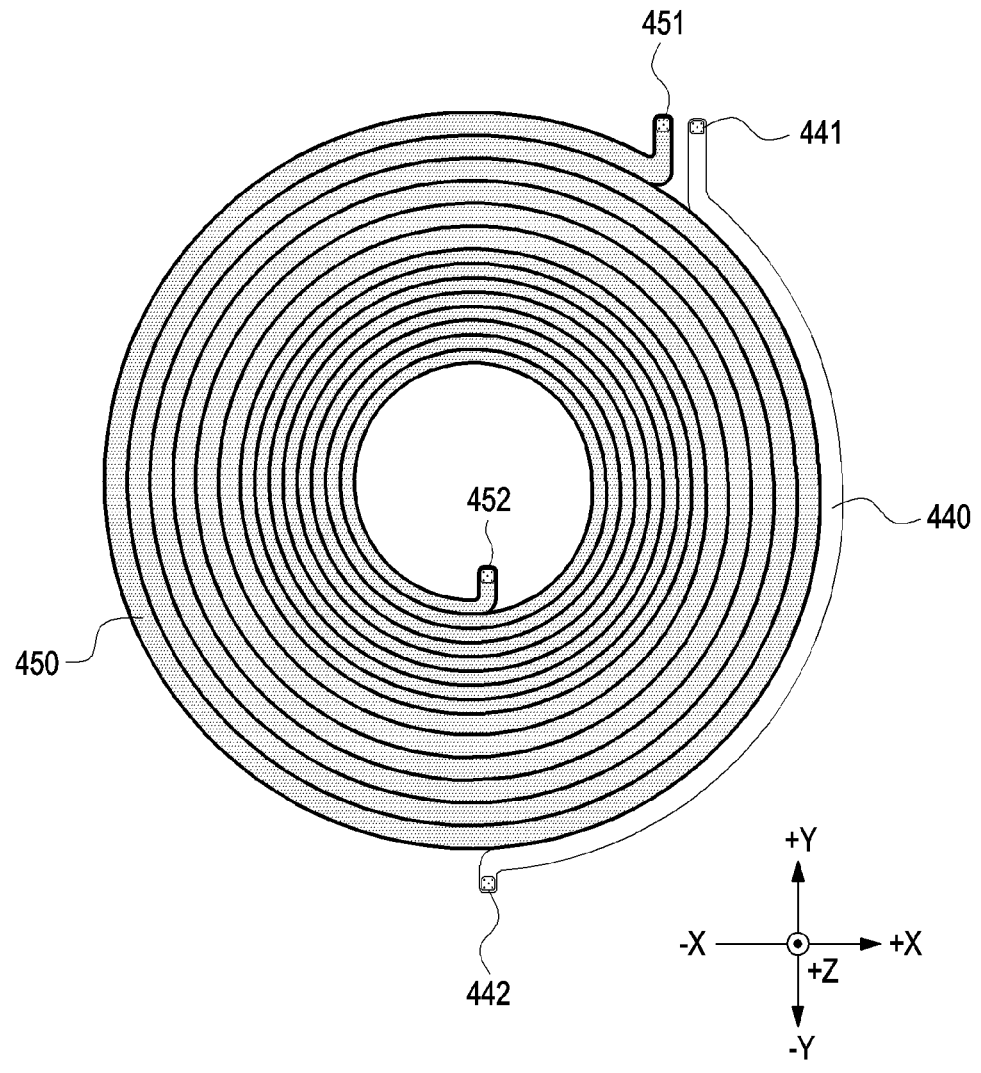
FIG. 10B is a planar view of a first coil and a second coil according to an embodiment of the disclosure.

FIG. 10B is a planar view of a first coil and a second coil according to an embodiment of the disclosure.

Figure 11:
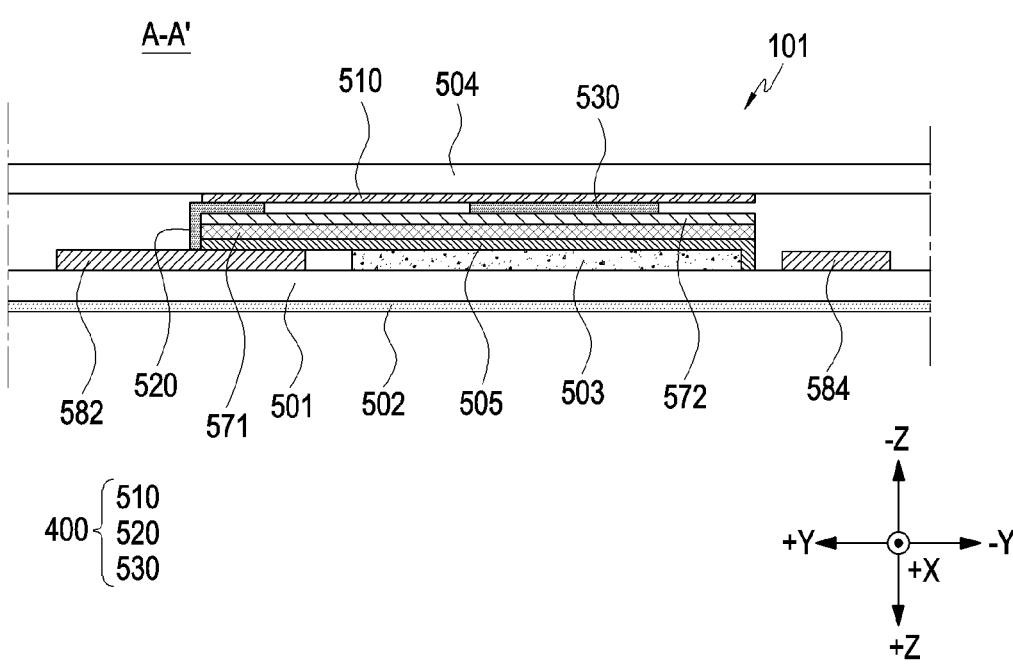
FIG. 11 is a sectional view taken along line A-A' of FIG. 3 according to an embodiment of the disclosure.
Figure 12:
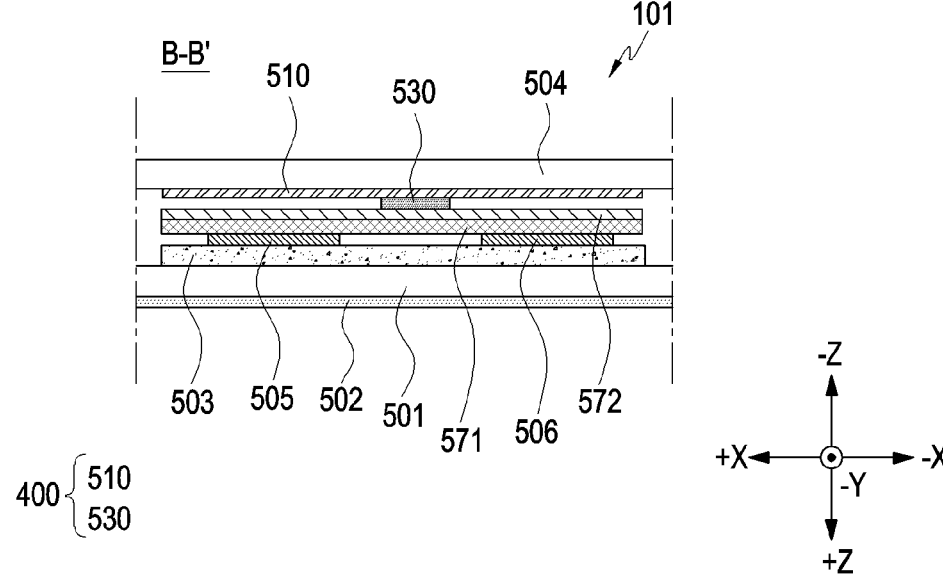
FIG. 12 is a sectional view taken along line B-B' of FIG. 3 according to an embodiment of the disclosure.
Figure 13:
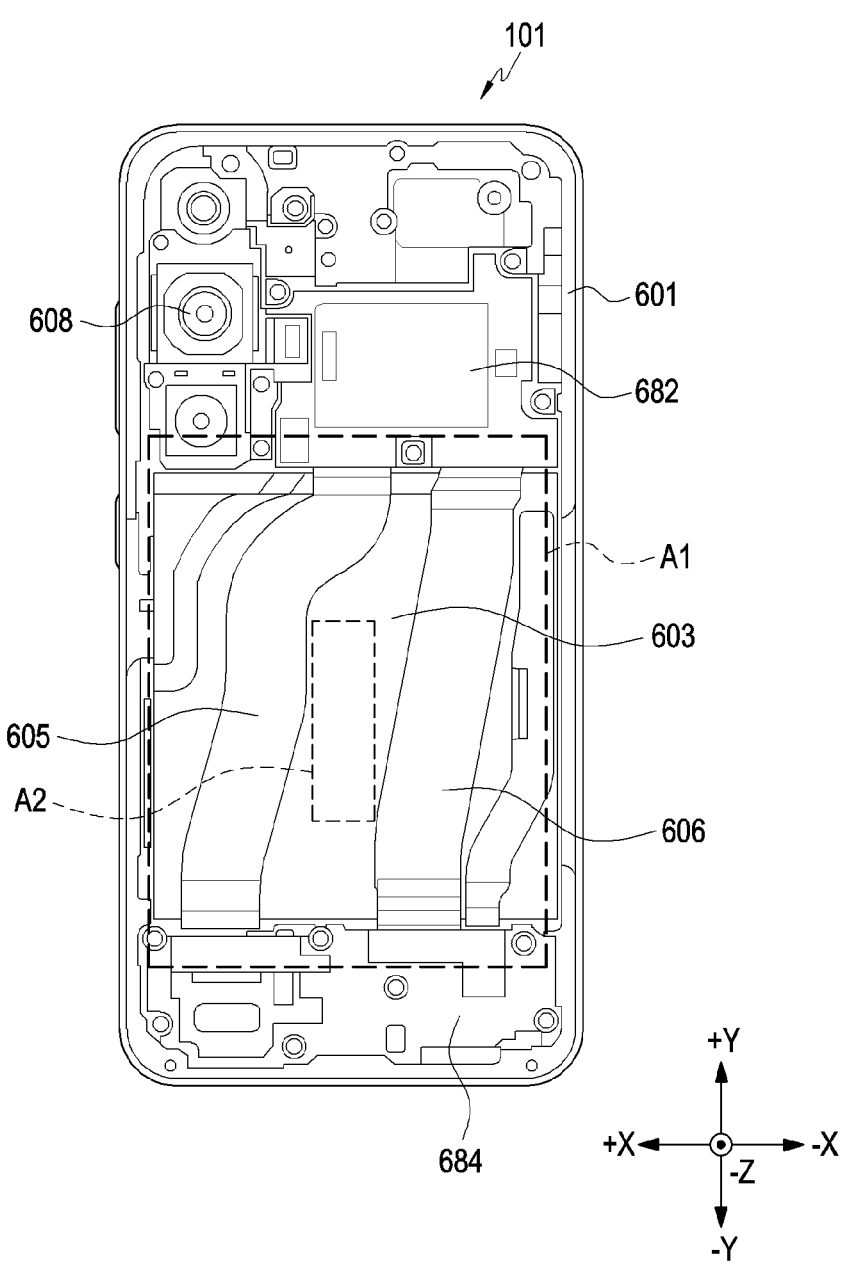
FIG. 13 is a planar view of an electronic device according to an embodiment of the disclosure.

The embodiments in FIGS. 9 to 10C may be coupleable to the embodiments in FIGS. 1 to 8 or the embodiments in FIGS. 11 to 13.

Referring to FIGS. 9 to 10B, an antenna structure (e.g., the antenna structure 400 in FIG. 5) may include a base board (e.g., the base board 410 in FIG. 5), a first FPCB (e.g., the first FPCB 420 in FIG. 5), a conductive member 430, a first coil 440 disposed on the base board, or a second coil 450 disposed on the base board.

The configuration of the conductive member 430, the first coil 440, or the second coil 450 in FIGS. 9 to 10B may be partially or entirely identical to that of the conductive member 430, the first coil 440, or the second coil 450 in FIGS. 5 to 6.

According to an embodiment, the first coil 440 may include a first end portion 441 (e.g., the first end portion 441 in FIG. 6) and a second end portion 442 (e.g., the second end portion 442 in FIG. 6).

According to an embodiment, the second coil 450 may include a third end portion 451 (e.g., the third end portion 451 in FIG. 6) and a fourth end portion 452 (e.g., the fourth end portion 452 in FIG. 6).

According to an embodiment, the conductive member 430 may electrically connect the second end portion 442 and the fourth end portion 452. In addition, the first FPCB (e.g., the first FPCB 420 in FIG. 5) may electrically connect the first end portion 441 and the third end portion 451.

According to an embodiment, at least a portion of the second coil 450 may be disposed inside the first coil 440.

Referring to FIG. 9, the first coil 440 and the second coil 450 may be formed in a loop shape to be electrically connected to each other and may function as a single coil.

Referring to FIGS. 10A to 10B, the first coil 440 and the second coil 450 may be formed in a loop shape to be electrically connected to each other and may function as a single coil.

Referring to FIGS. 10A to 10B, the first coil 440 may extend to rotate in a first rotation direction (e.g., a clockwise direction based on the Z axis in FIGS. 10A to 10B) from the first end portion 441 toward the second end portion 442.

According to an embodiment, the second coil 450 may extend to rotate in a second rotation direction (e.g., a counterclockwise direction based on the Z axis in FIGS. 10A to 10B) opposite to the first rotation direction from the third end portion 451 toward the fourth end portion 452.

According to an embodiment, the second coil 450 may extend to rotate in the first rotation direction from the fourth end portion 452 toward the third end portion 451.

FIG. 11 is a sectional view taken along line A-A' of FIG. 3 according to an embodiment of the disclosure.

FIG. 12 is a sectional view taken along line B-B' of FIG. 3 according to an embodiment of the disclosure.

The embodiments in FIGS. 11 and 12 may be coupleable to the embodiments in FIGS. 1 to 10 or the embodiment in FIG. 13.

Referring to FIGS. 11 and 12, an electronic device 101 (e.g., the electronic device 101 in FIGS. 1 to 4) may include a first support member 501, a display 502, a battery 503, a rear plate 504, a second FPCB 505, a third FPCB 506, an antenna structure 400, a coil pattern layer 510, a first FPCB 520, a conductive member 530, a heat dissipation sheet 571, a shielding sheet 572, a main circuit board 582, or a sub-circuit board 584.

The configuration of the first support member 501, the display 502, the battery 503, the rear plate 504, the main circuit board 582, or the sub-circuit board 584 in FIGS. 11 and 12 may be partially or entirely identical to that of the first support member 372, the display 330, the battery 350, the rear plate 380, the main circuit board 342, or the sub-circuit board 344 in FIG. 4.

The configuration of the antenna structure 400, the first FPCB 520, or the conductive member 530 in FIGS. 11 and 12 may be partially or entirely identical to that of the antenna structure 400, the first FPCB 420, or the conductive member 430 in FIG. 5.

The configuration of the coil pattern layer 510 in FIGS. 11 and 12 may be partially or entirely identical to that of the base board 410 and the at least one coil 440, 450, or 460 in FIGS. 5 to 6.

According to an embodiment, the coil pattern layer 510 may include a base board (e.g., the base board 410 in FIGS. 5 to 6) and at least one coil (e.g., the at least one coil 440, 450, or 460 in FIGS. 5 to 6).

According to an embodiment, the first support member 501 and the rear plate 504 may configure a housing of the electronic device 101.

According to an embodiment, the battery 503 may be disposed between the first support member 501 and the rear plate 504.

According to an embodiment, the second FPCB 505 may be a flexible printed circuit board (FPCB). One end of the second FPCB 505 may be electrically connected to the main circuit board 582, and the other end of the second FPCB 505 may be electrically connected to a driver circuit (driver circuitry) of the display 502.

According to an embodiment, the second FPCB 505 may overlap at least a portion of the battery 503 based on the thickness direction (e.g., the Z-axis direction in FIGS. 11 and 12) of the electronic device 101.

According to an embodiment, the thickness direction of the electronic device 101 may be substantially identical to a direction from the battery 503 toward the rear plate 504 or a direction from the rear plate 504 toward the battery 503.

According to an embodiment, the third FPCB 506 may be a flexible printed circuit board (FPCB). One end of the third FPCB 506 may be electrically connected to the main circuit board 582, and the other end of the third FPCB 506 may be electrically connected to the sub-circuit board 584.

According to an embodiment, one end of the first FPCB 520 may be electrically connected to the coil pattern layer 510 (e.g., the base board 410 and/or the at least one coil 440, 450, or 460 in FIGS. 5 to 6), and the other end of the first FPCB 520 may be electrically connected to the main circuit board 582.

According to an embodiment, the heat dissipation sheet 571 may be disposed between the battery 503 and the antenna structure 400. For example, the heat dissipation sheet 571 may be disposed to cover the battery 503 and/or the second FPCB 505.

According to an embodiment, the heat dissipation sheet 571 may allow heat generated from the battery 503 or an electrical component inside the electronic device 101 to face a surface direction (e.g., a surface direction including the X axis and the Y axis in FIGS. 11 and 12) of the heat dissipation sheet 571.

According to an embodiment, the heat dissipation sheet 571 may include a graphite sheet.

According to an embodiment, the shielding sheet 572 may be disposed between the battery 503 and the antenna structure 400. For example, the shielding sheet 572 may be stacked on a surface (e.g., a surface facing the −Z direction in FIGS. 11 and 12) of the heat dissipation sheet 571.

According to an embodiment, the shielding sheet 572 may block electromagnetic waves generated from an electrical component inside the electronic device 101 or an RF signal generated from the antenna structure 400. The shielding sheet 572 may include a sheet made of copper (CU). The shielding sheet 572 may include a tape made of copper (CU) which is adhered on one surface of the heat dissipation sheet 571.

According to an embodiment, the conductive member 530 may electrically connect a second end portion (e.g., the second end portion 442 in FIGS. 5 to 6) of a first coil (e.g., the first coil 440 in FIGS. 5 to 6) of the coil pattern layer 510 and a fourth end portion (e.g., the fourth end portion 452 in FIGS. 5 to 6) of a second coil (e.g., the second coil 450 in FIGS. 5 to 6).

Referring to FIG. 12, the conductive member 530 may overlap the shielding sheet 572, the heat dissipation sheet 571, or the battery 503 based on the thickness direction (e.g., the Z-axis direction in FIGS. 11 and 12) of the electronic device 101.

According to an embodiment, a portion of the heat dissipation sheet 571 may be disposed between the conductive member 530 and the battery 503. According to an embodiment, the heat dissipation sheet 571 may overlap the conductive member 530 based on the thickness direction (e.g., the Z-axis direction in FIGS. 11 and 12) of the electronic device 101.

According to an embodiment, the conductive member 530 may generate heat by a current flowing when the electronic device 101 performs a wireless charging operation. According to an embodiment, the disposition of a portion of the heat dissipation sheet 571 between the conductive member 530 and the battery 503 may improve the heat dissipation performance of the electronic device 101 compared to an electronic device having no dissipation sheet between the conductive member and the battery.

Referring to FIG. 12, the conductive member 530 may not overlap the second FPCB 505 or the third FPCB 506 based on the thickness direction (e.g., the Z-axis direction in FIGS. 11 and 12) of the electronic device 101.

FIG. 13 is a planar view of an electronic device according to an embodiment of the disclosure.

The embodiment in FIG. 13 may be coupleable to the embodiments in FIGS. 1 to 12.

Referring to FIG. 13, the electronic device 101 (e.g., the electronic device 101 in FIGS. 1 to 4 or the electronic device 101 in FIGS. 11 and 12) may include a first support member 601, a battery 603, a second FPCB 605, a third FPCB 606, a camera 608, a main circuit board 682, or a sub-circuit board 684.

The configuration of the first support member 601, a battery 603, the second FPCB 605, the third FPCB 606, the main circuit board 682, or the sub-circuit board 684 in FIG. 13 may be partially or entirely identical to that of the first support member 501, the battery 503, the second FPCB 505, the third FPCB 506, the main circuit board 582, or the sub-circuit board 584 in FIGS. 11 and 12.

The configuration of the camera 608 of FIG. 13 may be entirely or partially identical to that of the camera 312 of FIG. 3.

According to an embodiment, the second FPCB 605 may electrically connect a driver circuit of a display (e.g., the display 502 in FIGS. 11 and 12) and the main circuit board 682.

According to an embodiment, the third FPCB 606 may electrically connect the main circuit board 682 and the sub-circuit board 684.

According to an embodiment, an antenna structure (e.g., the antenna structure 400 in FIG. 5 or the antenna structure 400 in FIGS. 11 and 12) or a base board (e.g., the base board 410 in FIG. 5 or the coil pattern layer (base board) 510 in FIGS. 11 and 12) of the antenna structure may be disposed to overlap at least a portion of the battery 603 based on the thickness direction (e.g., the Z-axis direction in FIG. 13) of the electronic device 101.

A first area A1 illustrated in the drawing is a dotted line for explaining an area (or space) in which the antenna structure (or base board) is disposed. For example, the antenna structure (or base board) may be disposed on the first area A1.

The antenna structure (or base board) may be disposed to overlap at least a portion of the second FPCB 605 or at least a portion of the third FPCB 606 based on the thickness direction (e.g., the Z-axis direction in FIG. 13) of the electronic device 101.

According to an embodiment, a conductive member (e.g., the conductive member 430 in FIG. 5 or the conductive member 530 in FIGS. 11 and 12) may be disposed to overlap at least a portion of the battery 603 based on the thickness direction (e.g., the Z-axis direction in FIG. 13) of the electronic device 101.

A second area A2 illustrated in the drawing is a dotted line for explaining an area (or space) in which the conductive member is disposed. For example, the conductive member may be disposed on the second area A2.

According to an embodiment, the conductive member may be disposed not to overlap the second FPCB 605 or the third FPCB 606 based on the thickness direction (e.g., the Z-axis direction in FIG to 13) of the electronic device 101.

In some embodiments, a structure for wireless charging may be disposed on a rear surface (e.g., a direction opposite to display disposition) of an electronic device. A wireless charging structure may include a board and a wireless charging coil mounted to the board.

In the wireless charging structure, a connector (e.g., a FPCB) for connecting the wireless charging coil and a main circuit board (e.g., a PCB) may be provided and a partial area of the connector may overlap a partial area of the wireless charging coil.

In the related art, an electronic device having been decreased in a size and/or in a thickness may cause the problem of making it difficult to secure sufficient space for a wireless charging structure and connector. Furthermore, in a portion in which a partial area of the connector overlaps a partial area of the wireless charging coil, it is difficult to design the electronic device to be thin due to interference with other components.

In addition, in the related art, the insufficient inner space of the electronic device makes it difficult to secure sufficient space for a heat dissipation member to improve heat dissipation performance of the electronic device.

An embodiment of the disclosure may provide an antenna structure for wireless charging and an electronic device including the antenna structure.

An embodiment of the disclosure may provide an antenna structure with improved heat dissipation performance and an electronic device including the antenna structure.

The disclosure is not limited to the above-described embodiments, but may be variously modified without departing from the spirit and scope of the disclosure.

According to an embodiment of the disclosure, the electronic device may provide a structure in which a conductive member of the antenna structure does not interfere with other components of the electronic device.

According to an embodiment of the disclosure, the electronic device may have improved heat dissipation performance due to a heat dissipation sheet of the antenna structure overlapping the conductive member.

According to an embodiment of the disclosure, the electronic device may improve battery charging performance due to the improved heat dissipation performance.

It will be appreciated by a person skilled in the art that effects which may be achieved from the disclosure are not limited to the effects described above and other effects that are not described above will be clearly understood from the following detailed description.

According to an embodiment of the disclosure, the electronic device 101 may include a housing 310, a battery 350, a main circuit board 342, or an antenna structure 390 or 400.

The battery may be disposed in the housing. The main circuit board may be disposed in the housing. The antenna structure may be disposed in the housing. The antenna structure may include a base board 410, a first FPCB 420, a first coil 440, a second coil 450, or a conductive member 430. The first FPCB may be electrically connected to the main circuit board. The first coil may include a first end portion 441 or a second end portion 442. The first end portion may be electrically connected to the first FPCB. The second coil may include a third end portion 451 or a fourth end portion 452. The third end portion may be electrically connected to the first FPCB. At least a portion of the second coil may be disposed inside the first coil. The conductive member may be electrically connected to the second end portion of the first coil and the fourth end portion of the second coil.

According to an embodiment, the first coil may be extended in a first rotation direction from the first end portion toward the second end portion. The second coil may be extended in a second rotation direction opposite to the first rotation direction from the third end portion toward the fourth end portion.

According to an embodiment, the first coil may extend in a first rotation direction from the first end portion toward the second end portion. The second coil may extend in a first rotation direction from the fourth end portion toward the third end portion. The second coil may have a shape wound at least twice.

According to an embodiment, the electronic device may further include a display 502 or a second FPCB 505. The display may be disposed in the housing. The second FPCB may be electrically connected to the display and the main circuit board.

According to an embodiment, the conductive member 530 may be not overlapped with the second FPCB in a thickness direction of the electronic device.

According to an embodiment, the electronic device may further include a heat dissipation sheet 571. The heat dissipation sheet may be disposed between the battery and the base board.

According to an embodiment, at least a portion of the heat dissipation sheet may be disposed between the battery and the base board in a thickness direction of the electronic device.

According to an embodiment, each of the first coil and the second coil may include a conductive pattern formed on a surface of the base board.

According to an embodiment, the antenna structure may further include a third coil 460. The third touch coil may be disposed outside the first coil or the second coil.

According to an embodiment, the third coil may include a conductive pattern formed on a surface of the base board.

According to an embodiment, the electronic device may further include a shielding sheet 572. The shielding sheet may be disposed between the battery and the base board.

According to an embodiment, the electronic device may further include a sub-circuit board 584 or a third FPCB 506. The sub-circuit board may be disposed in the housing. The third FPCB 506 may be electrically connected to the main circuit board and the sub-circuit board.

According to an embodiment, the conductive member 530 may be not overlapped with the third FPCB 506 in a thickness direction of the electronic device.

According to an embodiment, the conductive member may be overlapped at least a portion of the second coil in a thickness direction of the electronic device.

According to an embodiment, the conductive member may be disposed to cross the at least the portion of the second coil.

According to an embodiment of the disclosure, the electronic device 101 may include a housing 310, a battery 350, a main circuit board 342, or an antenna structure 390 or 400. The battery may be disposed in the housing. The main circuit board may be disposed in the housing. The antenna structure may be disposed in the housing. The antenna structure may include a base board 410, a first FPCB 420, a first coil 440, a second coil 450, or a conductive member 430. The first FPCB may be electrically connected to the main circuit board. The first coil may include a first end portion 441 or a second end portion 442. The first end portion may be electrically connected to the first FPCB. The second coil may include a third end portion 451 or a fourth end portion 452. The third end portion may be electrically connected to the first FPCB. The conductive member may be electrically connected to the second end portion of the first coil and the fourth end portion of the second coil. The conductive member may be overlapped with at least a portion of the second coil.

According to an embodiment, the conductive member may be disposed to cross the at least the portion of the second coil.

According to an embodiment, the first coil may be extended in a first rotation direction from the first end portion toward the second end portion. The second coil may be extended in the first rotation direction from the fourth end portion toward the third end portion. The second coil 450 may have a shape wound at least twice.

According to an embodiment, the first coil may have a semicircle shape, and the second coil may be have a spiral shape.

According to an embodiment, the electronic device may further include a heat dissipation sheet 571. The heat dissipation sheet may be disposed between the battery and the base board.

As mentioned above, in the detailed description of the disclosure, specific embodiments have been described, but it will be apparent to those of ordinary skill in the art that various modifications are possible without departing from the scope of the disclosure.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that one or more embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with one or more embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

One or more embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities, and some of the multiple entities may be separately disposed in different components. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a battery;
a main circuit board operatively connected to the battery; and
an antenna structure operatively connected to the main circuit board, the antenna structure including:
a base board disposed above the battery;
a wireless charging coil disposed on the base board, and comprising a first wound part including a first end portion and a second end portion and a second wound part wound inward from a third end portion to a fourth end portion, wherein the first wound part is wound around the second wound part; and
a first flexible printed circuit board (FPCB) configured to electrically connect the first end portion of the first wound part and the third end portion of the second wound part to the main circuit board; and
a conductive member disposed on the base board and being overlapped with a portion of the second wound part, the conductive member electrically connecting the second end portion of the first wound part and the fourth end portion of the second wound part, and
a second flexible printed circuit board (FPCB) extending through a gap between the battery and the base board, wherein the conductive member does not overlap with the second FPCB.

2. The electronic device of claim 1, wherein the first coil wound part is extended in a first rotation direction from the first end portion toward the second end portion, and
wherein the second wound part is extended in a second rotation direction from the third end portion toward the fourth end portion, the second rotation direction being opposite to the first rotation direction.

3. The electronic device of claim 1, wherein the first wound part extends in a first rotation direction from the first end portion toward the second end portion,
wherein the second wound part extends in the first rotation direction from the fourth end portion toward the third end portion, and
wherein the second wound part has a shape wound at least twice.

4. The electronic device of claim 1, further comprising a display,
wherein the second FPCB is electrically connected to the display.

5. The electronic device of claim 4, wherein the conductive member is not overlapped with the second FPCB in a thickness direction of the electronic device.

6. The electronic device of claim 1, further comprising a heat dissipation sheet between the battery and the base board.

7. The electronic device of claim 6, wherein at least a portion of the heat dissipation sheet is disposed between the battery and the conductive member in a thickness direction of the electronic device.

8. The electronic device of claim 1, wherein each of the first wound part and the second wound part includes a conductive pattern on a surface of the base board.

9. The electronic device of claim 1, wherein the antenna structure further comprises a third wound part outside the first wound part and the second wound part.

10. The electronic device of claim 9, wherein the third wound part includes a conductive pattern on a surface of the base board.

11. The electronic device of claim 1, further comprising a shielding sheet between the battery and the base board.

12. The electronic device of claim 1, further comprising:
a sub-circuit board; and
a third FPCB electrically connected to the main circuit board and the sub-circuit board.

13. The electronic device of claim 12, wherein the conductive member is not overlapped with the third FPCB in a thickness direction of the electronic device.

14. The electronic device of claim 1, wherein the conductive member is overlapped with at least the portion of the second wound part in a thickness direction of the electronic device.

15. The electronic device of claim 14, wherein the conductive member is disposed to cross the at least the portion of the second wound part.

16. The electronic device of claim 1, wherein the first wound part has a semi-circle shape, and
wherein the second wound part has a spiral shape.

* * * * *